United States Patent

[11] 3,612,083

| [72] | Inventor | Richard M. Kronk |
| | | Cincinnati, Ohio |
| [21] | Appl. No. | 887,908 |
| [22] | Filed | Dec. 24, 1969 |
| [45] | Patented | Oct. 12, 1971 |
| [73] | Assignee | General Electric Company |

[54] FLUID TANK
6 Claims, 1 Drawing Fig.

[52] U.S. Cl. .................................................... 137/43,
137/202, 137/265, 137/567, 137/576
[51] Int. Cl. ..................................................... G05d 9/02
[50] Field of Search ........................................... 137/43,
265, 566, 567, 571, 576

[56] References Cited
UNITED STATES PATENTS

| 2,510,098 | 6/1950 | Geisler .......................... | 137/43 |
| 2,942,611 | 6/1960 | Klank, Jr. et al. .............. | 137/43 |
| 2,953,156 | 9/1960 | Bryant. ......................... | 137/571 X |
| 3,377,779 | 4/1968 | Kronk et al. ................... | 55/204 |

Primary Examiner—Robert G. Nilson
Attorneys—Derek P. Lawrence, Erwin F. Berrier, Jr., Lee H. Sachs, Frank L. Neuhauser, Oscar B. Waddell and Joseph B. Forman ABSTRACT: A fluid tank for use with two discrete fluid systems, such as the hydraulic system and lubrication system of an aircraft gas turbine engine, includes a compartment for each fluid system and a jet pump for exchanging fluid between one compartment and the system associated with the other compartment in response to the fluid requirements of that system.

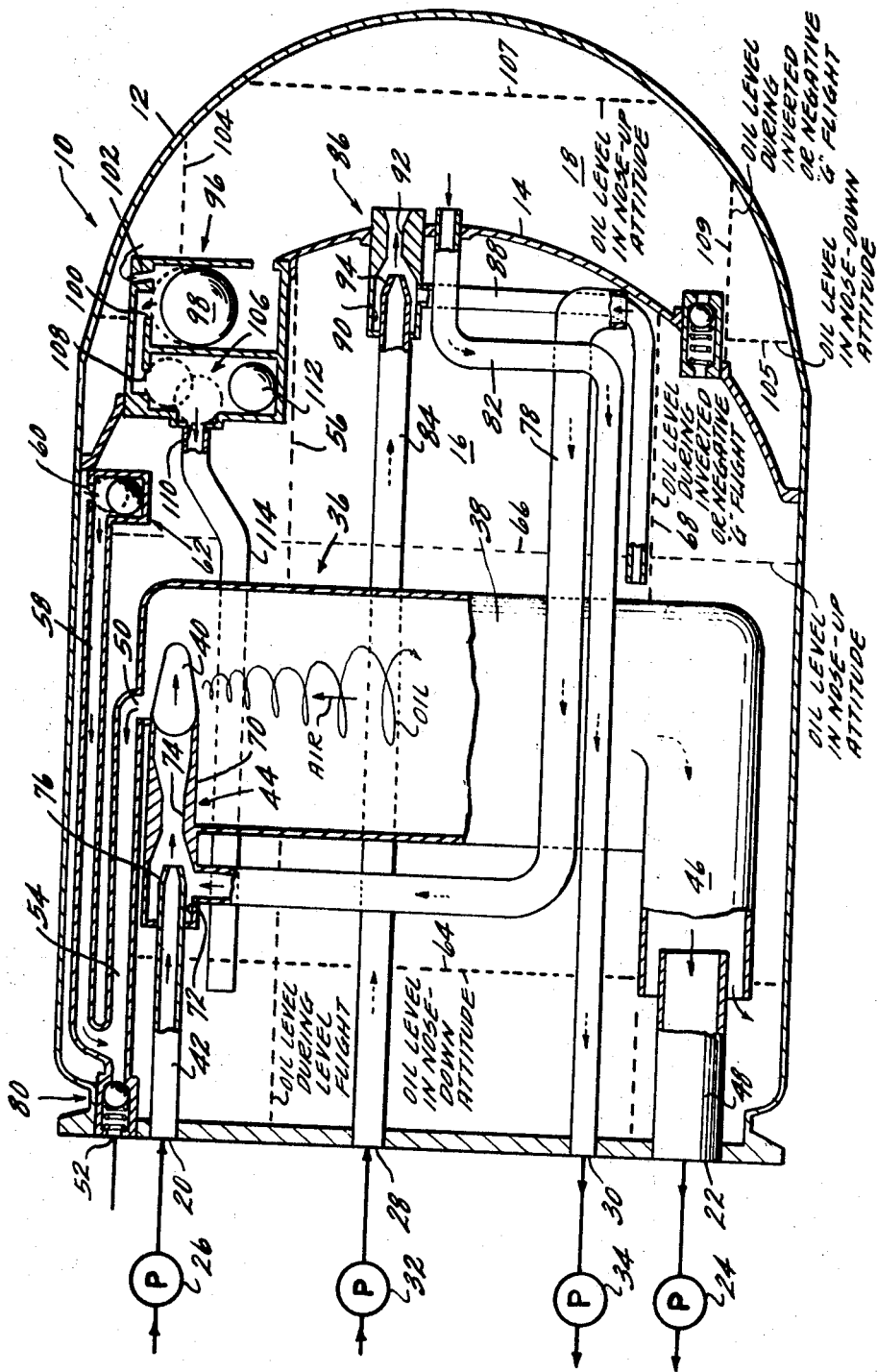

FLUID TANK

This invention relates to gas turbine engines and, more particularly, to an improved fluid tank for use in the hydraulic and lubrication systems of such engines.

The invention herein described was made in the course of or under a contract, or a subcontract thereunder, with the United States Department of the Air Force.

Where an identical fluid is used in both the hydraulic system and the lubrication system of an aircraft gas turbine engine, a considerable weight reduction may be realized by employing a single or common reservoir tank in lieu of a separate tank, having a separate fluid reserve, for each system. Previous attempts at combining the reservoir tanks so as to reduce system weight, however, have encountered several problems. One such problem stems from the fact that in most lubrication systems the scavenged oil is returned to the tank in a highly aerated condition, with the ratio of the volume of air returned to the volume of oil returned approaching or exceeding 4 to 1. While means for deaerating the scavenged oil are usually provided within the tank, such means are generally effective in reducing the oil aeration level to approximately 5 to 10 percent by volume of air which is generally above the preferred or tolerable working fluid aeration level for the hydraulic system. Another problem is found in the reduced working fluid contamination level required or desirable for the hydraulic system as compared with the tolerable contamination level for the lubrication system.

One object of the present invention is to provide a fluid tank for use with two or more fluid systems which overcomes the foregoing problems.

Another object of the present invention is to provide a system for minimum exchange of fluid between otherwise discrete closed-loop fluid systems in response to the fluid requirements of one of the systems.

Yet another object of this invention is a fluid tank of simple and economical construction which is adapted to function as a fluid reservoir for two or more fluid systems having different working fluid aeration and contamination level tolerances.

Briefly stated, the above and other objects, which will become apparent upon reading the following description of the preferred embodiment, are achieved in the present invention by providing a fluid tank having two or more compartments adapted for connection with two or more discrete closed-loop fluid systems, and means for exchanging fluid between the compartments in response to system fluid requirements. In one form, the tank is divided into two compartments which are placed in flow communication through a float valve and the siphon tube of a jet pump in a manner operative to maintain a predetermined level of fluid in one compartment during normal operation of the system associated with that compartment and providing a predetermined amount of make-up fluid in the event of leakage from the system associated with that compartment.

While the specification concludes with claims particularly pointing out and distinctly claiming the subject matter of this invention, it is believed that the invention will be better understood upon reading the following description of the preferred embodiment in connection with the accompanying drawing wherein there is shown a diagrammatical cross-sectional view of an exemplary embodiment of the present invention.

With reference now to the drawing, a fluid or reservoir tank has been shown generally at 10 as comprising an outer shell or housing 12 having an internal wall member 14 which divides the housing into two compartments, 16 and 18. The tank 10 is formed with an inlet 20 and an outlet 22 for connection of compartment 16 with a fluid system, such as an aircraft engine lubrication system having a lube supply pump 24 and a lubrication sump or scavenged pump 26. In like manner, an inlet 28 and an outlet 30 are provided for compartment 18 to connect that compartment with a fluid system, such as an aircraft engine hydraulic system having a hydraulic return pump 32 and a hydraulic supply pump 34.

Where the fluid returned to inlet 20 comprises an air/oil mixture, suitable means for deaerating or separating the air from the oil may be provided as has been shown generally at 36 as comprising a cylindrical body 38 having a tangential inlet 40 at one end and a tangential outlet 46 at the other end. The inlet 40 communicates with the air/oil mixture at inlet 20 through a suitable conduit 42 and jet pump means 44, the function of which will be hereinafter described, while the tangential outlet 46 telescopes over and is spaced from a conduit or standpipe 48 in flow communication with the outlet 22.

In operation, the air/oil mixture is introduced through the inlet 40 with a velocity sufficient to induce a high velocity vortical or cyclonic flow of the air/oil mixture within the cylindrical body 38. The high centrifugal force imparted to the air/oil mixture as a result of such vortical flow forces the denser oil particles outwardly against the inner surface of the cylindrical body 38, effectively squeezing the air out of the oil. The separated air is then vented through a port 50 formed at the inlet end of the deaerator means 36 to a tank outlet 52 through a suitable conduit 54.

In the environment of an aircraft engine, the compartment 16 is generally sized so that the oil level during steady state level flight is generally as shown by the broken line at 56. The air space above the oil is suitably vented to tank outlet 52 through a conduit 58 having a vent port 60 which is closable by gravity valve means 62. As will be understood, the tank 10 may be subjected to various attitudes and "G" forces during aircraft flight which would change the relative disposition of the oil in the compartment 16. For example, with the depicted tank arrangement, the oil levels with the aircraft in a nose-down attitude, a nose-up attitude and during inverted flight of under negative "G" conditions would be generally as indicated by the broken lines 64, 66 and 68, respectively.

It will be noted that the tangential outlet 46 telescopes over the lube supply conduit 48 leading to the lubrication supply pump 24 so that when the tank 10 is disposed in the nose-down attitude, the tangential velocity of the deaerated oil effluxing from tangential outlet 46 is sufficient to force-feed oil to the pump 24.

In order to insure that a sufficient quantity of oil is delivered to pump 24 when the tank is disposed in the nose-down attitude, the discharge from tangential outlet 46 should preferably exceed the requirements of pump 24. To this end, means, such as the jet pump 44, may be provided to supply oil to deaerator means 36 over and above that returning to conduit 42. The jet pump 44 has been shown as comprising a suitable housing 70 formed with a chamber 72 therein which communicates with the tangential inlet 40 through a throat 74. The inlet conduit 42 projects into the chamber 72 and terminates in a nozzle 76 which is adapted to discharge the air/oil mixture returned from the lubrication system into the throat 74 at a high velocity so as to pump oil from the compartment 16 into the deaerator means 36 through a lube make-up conduit 78 communicating with the chamber 72.

A suitable pressurizing relief valve, shown generally at 80, may be provided at the vent port or tank outlet 52 to maintain a predetermined pressurization level within the compartment 16.

With reference now to the second or hydraulic compartment 18, a suitable conduit 82 has been shown communicating that compartment with the outlet 30 for delivery of hydraulic fluid or oil to the pump 34. At the same time, a suitable conduit 84 is provided for delivery of the fluid returning from the hydraulic system to means shown generally at 86 for exchanging fluid between chambers 16 and 18 in response to the fluid requirements of the hydraulic system so as to maintain, in cooperation with a float valve 96, a predetermined level of fluid in the second compartment as well as provide a predetermined amount of make-up fluid in the event of leakage from the hydraulic system.

While the means 86 may take on a variety of forms, such means have been shown in the drawing as comprising a jet pump including a conduit 88 communicating with a chamber 90 which in turn communicates with the chamber 18 through a throat 92. The inlet conduit 84 projects into the chamber 90 and terminates in a nozzle 94 so as to deliver the returning hydraulic fluid into the throat 92 at a high velocity and thereby pump oil from compartment 16 into compartment 18 during selective portions of operation.

Suitable float valve means have been shown generally at 96 as comprising a float 98 adapted to open and close a valve port 100 which communicates with the chamber 18 through a passage 102 so as to vent the compartment 18 and establish a predetermined level flight oil level within the compartment 18 as is indicated generally by the broken line at 104. As will be understood, the float 98 closes valve port 100 when the level flight oil level is at the predetermined level and opens port 100 and thus vents the air space of compartment 18 with that of compartment 16 when the level flight oil level is below the predetermined level.

To prevent inadvertent fluid exchange between compartments 16 and 18 during nose-up and nose-down attitudes and inverted flight or negative "G" conditions, wherein the oil level has been generally shown by the broken lines at 105, 107 and 109, respectively, suitable gravity valve means 106 are provided which include an inlet valve port 108 and an outlet valve port 110 in series flow communication with the valve port 100 and a suitable closure member 112 adapted to close port 108 during inverted flight or negative "G" conditions and close port 110 when the tank 10 is in the nose-up attitude. A suitable standpipe or conduit 114 extends from valve port 110 to a position above the oil level 64 in compartment 16 when the tank 10 is in the nose-down attitude so as to prevent fluid exchange during this condition. It will be understood, however, that the standpipe 114 may be eliminated and the exchange of fluid between compartments 16 and 18, when the tank is in the nose-up attitude, may be reduced or eliminated by restricting the size of valve port 110, either singly or in combination with an adjustment of the relative pressure levels within tanks 16 and 18.

In operation, the supply or discharge of oil through conduit 88 will be governed by the pressure and hence the fluid level within compartment 18. For example, when the flow to the hydraulic system through conduit 82 exceeds the return flow through conduit 84, thereby reducing the fluid level and pressure level within compartment 18, return fluid is urged at high velocity by pump 32 into compartment 18 through throat 92 whereby fluid is pumped through means 86 from the compartment 16. Since valve port 100 is open when the oil level is so reduced, venting of compartment 18 to outlet 52 is provided until the fluid again reaches the predetermined level 104 whereupon valve port 100 is closed by the float 98.

During conditions of operation when the flow to the hydraulic system is equal to the return flow through conduit 84, the back pressure from the compartment 18 to the throat 92 will be sufficient to prevent pumping action by means 86. At the same time, during conditions of operation where the fluid return from the hydraulic system exceeds the flow to the system through conduit 82, the back pressure from compartment 18 to the throat 92 will be sufficient to cause the excess return fluid to be discharged through the conduit 88 into compartment 16.

From the foregoing, it will be appreciated that the present invention provides fluid tank of simplified and economical construction which eliminates the need for a separate tank for both the lubrication system and the hydraulic system of an aircraft engine and the increased weight associated therewith while, at the same time, minimizing the interchange of fluid between the two systems and controlling such interchange in response to fluid requirements of the hydraulic system.

Additionally, it will be noted that in the event of a leak in the hydraulic system, a predetermined reserve of oil is available in compartment 16. In this connection, the inlet to the conduit 88 is preferably spaced at some given distance above that portion of the tank 10 forming the bottom of compartment 16 during level flight so as to prevent depletion of the fluid within compartment 16 below a level required for satisfactory and continued operation of the lubrication system.

While a preferred embodiment of the invention has been depicted and described, it will be appreciated that many modifications and changes may be made thereto without departing from the fundamental theme of the invention.

What is claimed is:

1. A liquid tank for use with aircraft gas turbine engine lubrication and hydraulic systems, said tank comprising:
    a first compartment having an inlet and an outlet for connection with said lubrication system,
    a second compartment having an inlet and an outlet for connection with said hydraulic system,
    means disposed in said first compartment for reducing the aeration level of liquid returned to said first compartment,
    means for discharging liquid returning to said tank from said hydraulic system to said first compartment and for pumping liquid from said first compartment into said second compartment in response to the liquid requirements of said hydraulic system.

2. The liquid tank of claim 1 further characterized in that said first compartment is sized to provide an air space above the liquid within said compartment, said tank further including an outlet in venting communication with said air space, and float valve means adapted to open and close venting communication between said second compartment and said air space in response to the liquid level in said second compartment when said aircraft is disposed in a level flight attitude.

3. The liquid tank of claim 2 further characterized by and including valve means intermediate said float valve means and said first compartment for closing venting communication between said compartments during periods when said aircraft is disposed in a nose-up attitude and during negative "G" or inverted flight of said aircraft to prevent inadvertent exchange of liquid between said compartments.

4. A fluid tank comprising:
    a first compartment having an inlet and an outlet for connection with a first closed-loop fluid system,
    a second compartment for connection with a second closed-loop fluid system, and
    a jet pump for receiving fluid returning to said tank from said second system, said jet pump including a discharge throat in flow communication with said second compartment and a siphon conduit communicating with the fluid in said first compartment, whereby fluid is exchanged between said first compartment and said second system so as to maintain a predetermined level of fluid in said second compartment.

5. The fluid tank of claim 4 further characterized by and including valve means for venting said second compartment when the fluid level is below said predetermined level.

6. A fluid tank comprising:
    a first compartment having an inlet and an outlet for connection with a first closed-loop system including a supply pump communicating with said outlet, a second compartment adapted for connection with a second closed-loop fluid system, means for exchanging fluid between said first compartment and said second system so as to maintain a predetermined level of fluid in said second compartment and provide a predetermined amount of make-up fluid in said first compartment for said second system in the event of leakage from said second system, deaerator means disposed in said first compartment for reducing the aeration level of fluid returning to said first compartment from said first system, said deaerator means having a tangential inlet and a tangential outlet and adapted to generate vortical fluid flow therebetween, a conduit communicating with said first compartment outlet and having an open end telescoped within and spaced from said tangential outlet, and jet pump means for supplying fluid from said first compartment to the inlet of said deaerator means, whereby deaerated fluid, in quantities sufficient to satisfy the requirements of said supply pump, is delivered to said first compartment outlet at all attitudes of said fluid tank.